Sept. 7, 1926.  J. G. CLARK  1,599,210
DEMOUNTABLE RIM
Filed June 6, 1924
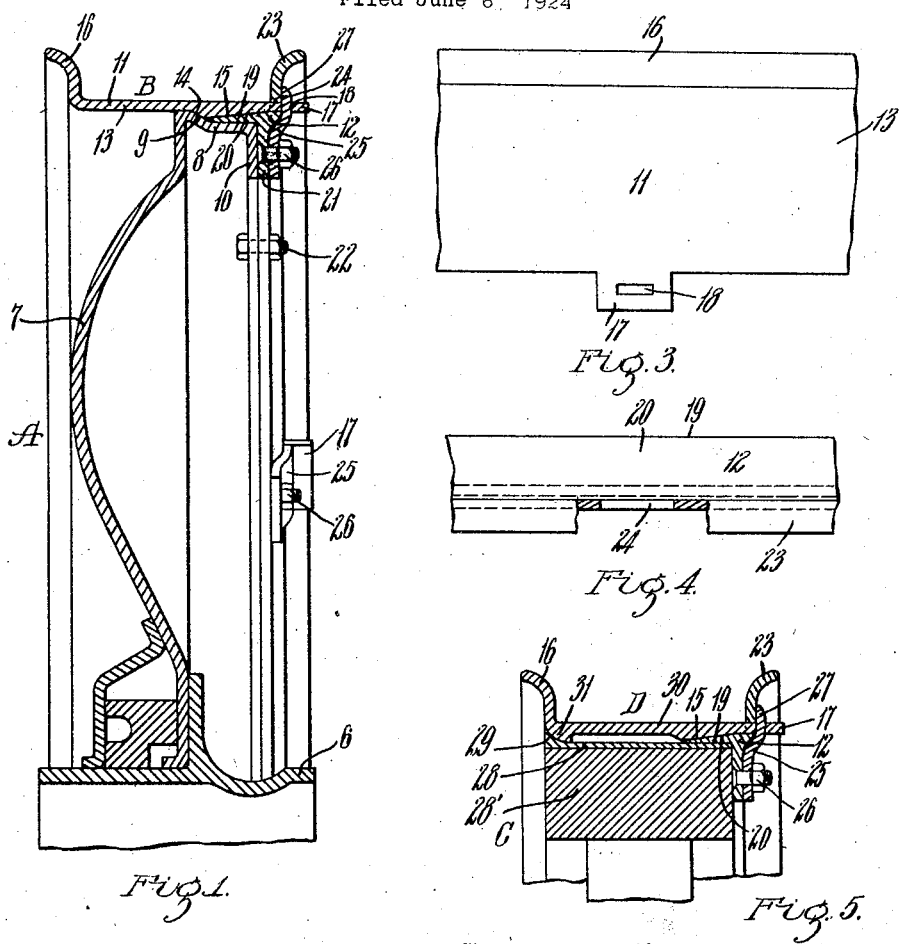
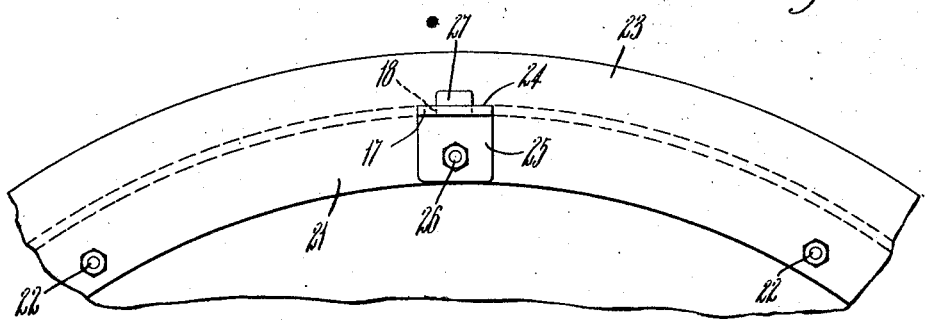
Inventor:
James G. Clark,
by his attorney,
Charles S. Gooding.

Patented Sept. 7, 1926.

1,599,210

UNITED STATES PATENT OFFICE.

JAMES G. CLARK, OF BOSTON, MASSACHUSETTS.

DEMOUNTABLE RIM.

Application filed June 6, 1924. Serial No. 718,402.

This invention relates to an improved demountable rim for vehicle wheels and is especially adapted for use with pneumatic automobile tires.

The object of the invention is to provide a two-part demountable rim from which the tire can be readily removed, and to which it can be firmly and easily attached.

The invention consists in a two-part demountable rim for vehicle wheels as set forth in the following specification and particularly as pointed out in the claim thereof.

Referring to the drawings:

Figure 1 is a central longitudinal section through a disc type vehicle wheel, a demountable rim embodying my invention being illustrated attached thereto.

Fig. 2 is a front elevation of a portion of the vehicle wheel and demountable rim illustrated in Fig. 1.

Fig. 3 is a plan view of a portion of the main rim section of the demountable rim.

Fig. 4 is a detail plan view of a portion of the auxiliary rim section of the demountable rim, a portion thereof being broken away and illustrated in section.

Fig. 5 is a sectional view similar to Fig. 1, but illustrating a demountable rim embodying my invention applied to a wooden type of vehicle wheel.

Like numerals refer to like parts throughout the several views of the drawings.

In the drawings, A represents a portion of a disc type vehicle wheel in which 6 is a hub, 7 a disc body portion, and 8 an outwardly extending circumferential flange, preferably formed integral with said body portion and constituting a permanent rim for said vehicle wheel. The permanent rim 8 has a beveled shouldered portion 9 extending entirely therearound, while the outer portion of said permanent rim has an inwardly extending flange 10 also extending entirely therearound.

Mounted upon the permanent rim 8 of the vehicle wheel A is a demountable rim B, preferably of a type for holding a quick detachable straight side form of pneumatic tire, although said demountable rim may be of the clincher type, if it is so desired. The demountable rim B embodies therein a main rim section 11 and an auxiliary rim section 12. The main rim section 11 comprises a cylindrical body portion 13 which encircles the permanent rim 8, and said body portion 13 has a beveled shoulder 14 formed upon the inner side thereof which is oppositely disposed to and abuts against the shouldered portion 9 of said permanent rim. The body portion 13 of the main rim section 11 also has a beveled surface 15 formed upon the inner side thereof for purposes hereafter to be more fully explained, said surface 15 converging toward the surface of the shoulder 14, while projecting outwardly from the outer side thereof is the usual tire retaining side flange 16. Upon the opposite edge of the main rim section 11 from the side flange 16 a plurality of tongues 17 are provided, said tongues being located at intervals along the edge of said rim sections. Each tongue 17 has an opening 18 provided therein as illustrated in Fig. 3.

The auxiliary rim section 12 embodies therein a body portion 19 which encircles and closely fits a portion of the periphery of the permanent rim 8, and the outer surface of said body portion is beveled at 20 to engage the beveled surface 15 of the main rim section 11. Extending inwardly from the body portion 19 of the auxiliary rim section 12 is a flange 21 and said auxiliary rim section is detachably secured to the flange 10 of the permanent rim 8 through the medium of a plurality of bolts 22 which extend through said flanges 10 and 21. The auxiliary rim section 12 is also provided with a tire retaining side flange 23, the latter having openings 24 formed therein to receive the tongues 17 of the main rim section 11.

The rim sections 11 and 12 are securely held together by a plurality of locking members 25 which are fastened to the flange 21 of the auxiliary rim section 12 by bolts 26, said locking members 25 being provided with tongues 27 which project through the openings 18 provided in the tongues 17 of the main rim section 11, the openings 18 being so positioned that the inner surface of the tongues 27 will contact with the outer surface of the side flange 23 and thereby prevent said rim sections from spreading relatively to each other.

When in use, the demountable rim B with the tire mounted thereon may be removed from the permanent rim 8 of the vehicle wheel A by simply removing the bolts 22, the demountable rim then being easily disengaged from the permanent rim 8 by sliding the former upon the latter toward the right in Fig. 1, and a spare tire may always be mounted upon said demountable rim B in readiness to be applied to the vehicle wheel.

When it is desired to remove the tire from the demountable rim, the same is accomplished by removing the bolts 26 and removing the locking members 25 from the openings 18 in the main rim section 11, and said auxiliary rim section 12 may then be removed from within the main rim section 11, thereby permitting a tire, which, when in position, is mounted upon the body portion 13 of the main rim section 11 between the side flange 16 and 23 to be removed from said main rim section.

When the demountable rim B is mounted upon a vehicle wheel A, pressure upon the tire or demountable rim longitudinally of the axis of the wheel acting to spread the rim sections apart, or to force them together, will be borne by the beveled surfaces 9, 14, 15 and 20 so that practically none of the strain will fall upon the locking members 25 or the tongues 17 of the main rim section 11, and the principal function performed by the locking members 25 is to hold the rim sections 11 and 12 together when the demountable rim, as a whole, is removed from the vehicle wheel.

In Fig. 5 I have illustrated a modified embodiment of my invention in which a demountable rim D is illustrated mounted upon a well known type of vehicle wheel C provided with a wooden felloe 28′ around the periphery of which is a metal felloe band 28, the latter being provided with a circumferentially extending stop flange 29 at one side thereof. The demountable rim D comprises the main rim section 30 identical in construction with the main rim section 11 of the demountable rim B previously described, except that said rim section 30 is provided with an inwardly extending circumferential flange 31 which abuts against the outwardly extending circumferential stop flange 29 provided upon the felloe band 28 and said flanges co-operate to prevent a lateral movement of the demountable rim D upon the wheel C laterally of said wheel toward the left in Fig. 5. A rim section 12 is detachably secured to the main rim section 30 of the demountable rim D by a plurality of locking members 25, said auxiliary rim section and locking members being exactly the same as previously described in connection with the demountable rim B.

I claim:—

A demountable rim comprising, in combination, a main rim section provided with a shouldered portion extending therearound having converging beveled surfaces, said main rim section also being provided with a plurality of tongues formed thereon, said tongues having openings therein, an auxiliary rim section mounted within said main rim section at one side thereof and provided with a beveled surface abutting against an adjacent beveled surface of said main rim section, said auxiliary rim section also being provided with openings therein, and with an inwardly projecting annular flange formed integral therewith and adapted to engage the side of a wheel, said tongues of said main rim sections projecting through said openings of said auxiliary rim section, and locking members fast to the flange of said auxiliary rim section and projecting through the openings in said tongues, said members holding said rim sections together.

In testimony whereof I have hereunto set my hand.

JAMES G. CLARK.